United States Patent
Almeida et al.

(10) Patent No.: US 11,490,147 B2
(45) Date of Patent: Nov. 1, 2022

(54) METHODS AND SYSTEMS FOR DISPLAYING A (PAYMENT) FORM ASSOCIATED WITH A VIDEO

(71) Applicant: HOTMART B.V., Amsterdam (NL)

(72) Inventors: Euber Bispo E. Almeida, Belo Horizonte (BR); Bruno Santana Rocha, Belo Horizonte (BR); Leonardo Guimarães Diniz, Dee Why (AU); Wallyson Nunes Da Mota, Belo Horizonte (BR); Wilson Ferreira Siqueira, Belo Horizonte (BR); João Pedro De Resende Paula, Belo Horizonte (BR)

(73) Assignee: HOTMART B.V.

( * ) Notice: Subject to any disclaimer, the term of this patent is extended or adjusted under 35 U.S.C. 154(b) by 0 days.

(21) Appl. No.: 16/403,076

(22) Filed: May 3, 2019

(65) Prior Publication Data
US 2019/0342599 A1  Nov. 7, 2019

(30) Foreign Application Priority Data
May 4, 2018  (EP) .................................. 18170724

(51) Int. Cl.
*H04N 21/262*  (2011.01)
*H04N 21/234*  (2011.01)
(Continued)

(52) U.S. Cl.
CPC . *H04N 21/26241* (2013.01); *H04N 21/23424* (2013.01); *H04N 21/4185* (2013.01); *H04N 21/4316* (2013.01); *H04N 21/47815* (2013.01)

(58) Field of Classification Search
None
See application file for complete search history.

(56) References Cited

U.S. PATENT DOCUMENTS 8,458,053 B1 *  6/2013  Buron ................ G06Q 30/0631
                                                  705/26.1
9,769,544 B1 *  9/2017  Pau ........................ H04N 21/45
(Continued)

FOREIGN PATENT DOCUMENTS

WO     2010068422 A2    6/2010
WO     2010129118 A1   11/2010

OTHER PUBLICATIONS

EP Search Report for application No. 18170724.1-1277; dated Nov. 15, 2018.
(Continued)

*Primary Examiner* — Alexander Q Huerta
(74) *Attorney, Agent, or Firm* — Mendelsohn Dunleavy, P.C.

(57) ABSTRACT

One aspect of this disclosure relates to a computer-implemented methods computers and messages for displaying a form associated with a video. The method comprises a number of steps. One step comprises transmitting at least one request message to a server system. The at least one request message comprises a video identifier and a form identifier. The video identifier indicates video information required for playing said video and the form identifier indicates form information required for displaying a form, e.g. an HTML form, associated with the video. Furthermore, the form information comprises a time indication defining a time in the video. Another step of the method comprises receiving at least one response message from the server system. The at least one response message comprises the video information and the form information. The method further comprises displaying the video using the video information. As one step, the method comprises, preferably while displaying the video, determining that the video reaches the time defined by said time indication. In response
(Continued)

to this determination, the method comprises displaying the form.

26 Claims, 6 Drawing Sheets

(51) Int. Cl.
  *H04N 21/4185* (2011.01)
  *H04N 21/431* (2011.01)
  *H04N 21/478* (2011.01)

(56) References Cited

U.S. PATENT DOCUMENTS

| | | | | |
|---|---|---|---|---|
| 2002/0078456 | A1* | 6/2002 | Hudson | H04N 21/2542 725/135 |
| 2003/0028873 | A1* | 2/2003 | Lemmons | H04N 21/25883 348/588 |
| 2003/0070182 | A1* | 4/2003 | Pierre | H04N 21/4325 725/135 |
| 2007/0265918 | A1 | 11/2007 | McMahon et al. | |
| 2008/0255961 | A1* | 10/2008 | Livesey | G06Q 30/02 375/E7.008 |
| 2009/0276805 | A1* | 11/2009 | Andrews II | H04N 21/435 725/38 |
| 2009/0297118 | A1* | 12/2009 | Fink | G06F 3/0482 386/278 |
| 2009/0307092 | A1* | 12/2009 | Gugliuzza | G06Q 30/0601 715/716 |
| 2010/0153831 | A1* | 6/2010 | Beaton | G06Q 30/0603 715/201 |
| 2011/0023060 | A1* | 1/2011 | Dmitriev | H04N 21/26258 705/14.66 |
| 2011/0162002 | A1* | 6/2011 | Jones | H04N 21/812 725/32 |
| 2013/0086607 | A1 | 4/2013 | Tom et al. | |
| 2013/0117262 | A1* | 5/2013 | Lenahan | G06Q 30/0623 707/736 |
| 2013/0151352 | A1* | 6/2013 | Tsai | H04N 21/4438 705/14.73 |
| 2013/0211888 | A1 | 8/2013 | Mwan et al. | |
| 2013/0254802 | A1 | 9/2013 | Lax et al. | |
| 2014/0109118 | A1* | 4/2014 | Kokenos | G06Q 30/02 725/5 |
| 2015/0074711 | A1* | 3/2015 | Spitz | H04N 21/8126 725/32 |
| 2016/0027067 | A1* | 1/2016 | Zindler | H04N 21/4725 705/14.72 |
| 2016/0104231 | A1* | 4/2016 | Taylor | G06Q 30/0269 705/26.81 |
| 2016/0239198 | A1* | 8/2016 | Shenkler | H04N 21/4316 |

OTHER PUBLICATIONS

Communication pursuant to Article 94(3) EPC for corresponding European application No. 18170724.1; dated Nov. 29, 2021 (5 pages).

\* cited by examiner

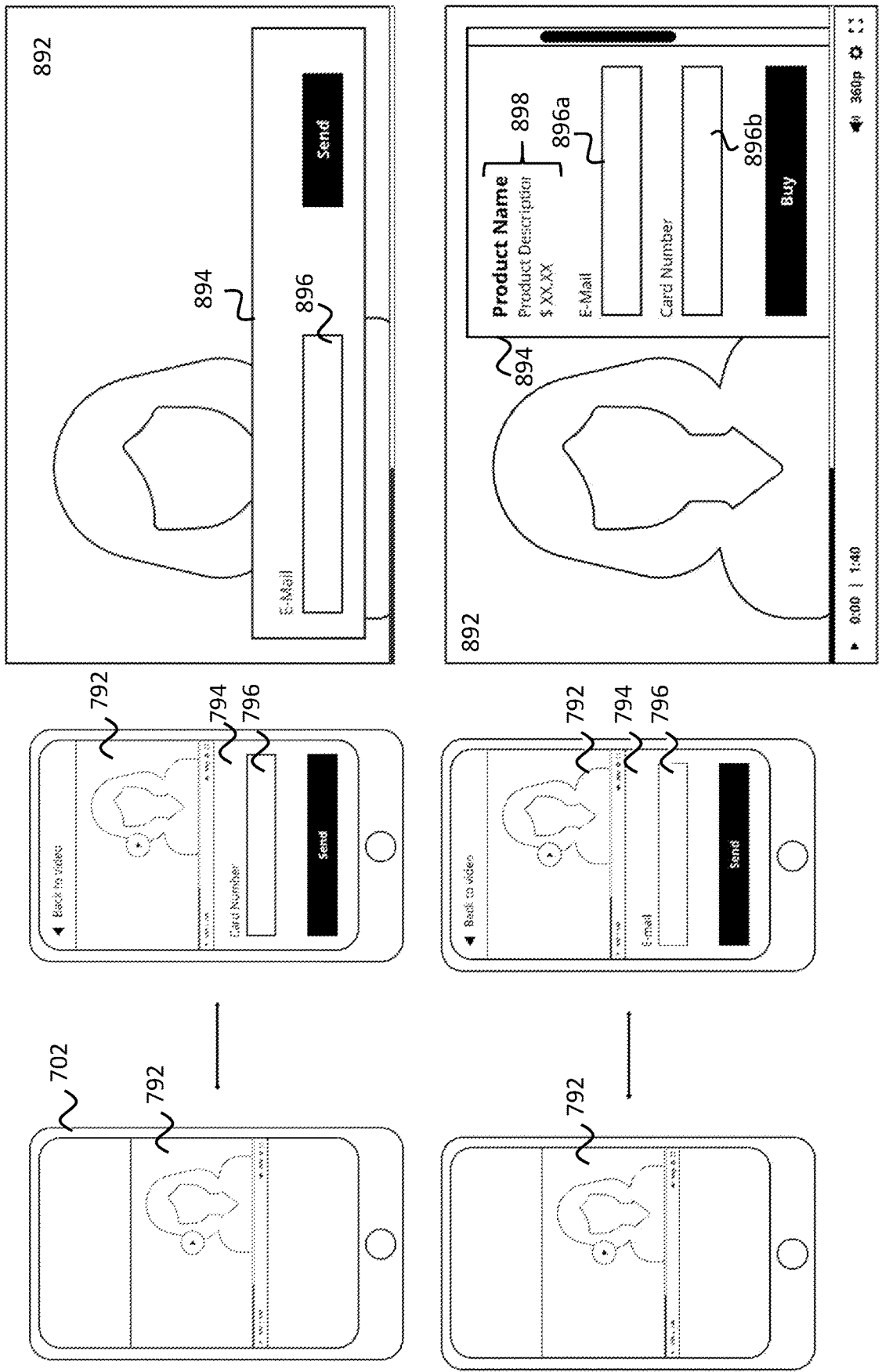

METHODS AND SYSTEMS FOR DISPLAYING A (PAYMENT) FORM ASSOCIATED WITH A VIDEO

FIELD OF THE INVENTION

This disclosure relates to methods, messages, computers, computer programs and computer-readable storage media for displaying a form associated with a video.

BACKGROUND

Web page developers often embed videos on web pages, which typically involves copying a piece of HTML code into the web page's source code. This piece of HTML code comprises a reference to information required for retrieving and displaying a video, which information is stored at a server of a third party. When a client computer then requests the source code of the web page from the server hosting the web page, the client computer receives this reference, which it can subsequently use to retrieve and display the video.

Advertisers aim to present their advertisements together with relevant online videos in order to maximize the number of users clicking on the advertisement. Methods are known for selecting advertisements for placement with videos. US 2013/0254802 A1 discloses such a method, wherein a request for sponsored content for presentation with a content item in a document is received. One or more candidate sponsored content items are identified based on one or more criteria. The criteria includes information related to the content item independent of the document, and information related to the document. One or more of the candidate sponsored content items are selected. The selected sponsored content items are transmitted for presentation with the content item.

Disadvantageously, this method does not allow the content provider or web page developer to control what exactly is ultimately presented on a display to a user. To illustrate, they cannot control which advertisements are placed together with the provided content, since these are determined by a separate advertisement provider.

Hence, there is a need in the art for a method for displaying a video that enables a content provider to better control the display of content at client computers.

SUMMARY

To this end one aspect of this disclosure relates to a computer-implemented method for displaying a form associated with a video. The method comprises a number of steps. One step comprises transmitting at least one request message to a server system. The at least one request message comprises a video identifier and a form identifier. The video identifier indicates video information required for playing said video and the form identifier indicates form information required for displaying a form, e.g. an HTML form, associated with the video. Furthermore, the form information comprises a time indication defining a time in the video. Another step of the method comprises receiving at least one response message from the server system. The at least one response message comprises the video information and the form information. The method further comprises displaying the video using the video information. As one step, the method comprises, preferably while displaying the video, determining that the video reaches the time defined by said time indication. In response to this determination, the method comprises displaying the form.

The time in the video as defined by the time indication may be an elapsed playtime of the video or may be a time offset with respect to a reference time in the video. Additionally or alternatively, the time may indicate a time period in the video, e.g. a time period between two elapsed playtimes of the video. Furthermore, determining that the video reaches a time may be understood as determining that the video is at said time and/or determining that the video is within a certain time period from said time and/or determining that the video has passed said time. The form optionally comprises at least one element for collecting user input, such as a text input element.

The method allows a content provider to accurately control when the video and the form, which may also be termed a "layer", are presented to a user and allow a content provider to control a display of a client computer. A content provider may himself choose a time in the video at which the form will display. In an example, the content provider delivers a piece of HTML code to be inserted in the source code of a web page, wherein the piece of HTML code comprises the video identifier and the form identifier. These identifiers may be understood to point respectively to video information and form information stored at a server of the content provider. Since the content provider can both control and/or define the video information and the form information, he can control the time in the video at which the form will display.

A video is suitable for attracting the attention of a user visiting a web page. The video content may relate to a product that can be bought via the web page. In an example, the video content explains characteristics of the product. However, unfortunately, a video is not suitable for obtaining complex user input that goes beyond controlling the video, such as pausing and/or fast forwarding the video. Preferably, forms, e.g. HTML forms, are implemented on a web page, with which a user can interact and through which a web page host can obtain user input, such as text input from a user. However, displaying a form on the web page during the entire playtime of a video may distract a viewer from the video content, which may be undesired.

To resolve these conflicting goals of attracting the attention of a user and obtaining user input, the method resolves a number of conflicting technical goals. One of these goals is that the form is at least presented during the video, since the form is associated with the video. The form for example is implemented to collect user input relating to the video content. Another goal is that the form is preferably presented as long as possible so that the human-machine interaction can occur at any time. The form may be understood to enable human-machine interaction by enabling the user to perform the task of transmitting a message comprising user input to the server system. A further technical goal is that the form is preferably presented as short as possible in order to distract from the video content as little as possible.

The method thus for example enables a web page developer to meet all the above mentioned technical requirements to some extent. The web page developer or content developer thus does not have to make an exclusive choice for one of the technical goals, herewith excluding at least partially meeting another technical requirement.

Advantageously, the method does not require to evaluate criteria for selecting which form information is to be transmitted to a client computer and/or for selecting which form is to be presented together with the video. The server system namely receives the form identifier that indicates the form information that needs to be transmitted to the client computer. No complex content selection method steps are involved and thus the computing resources that are required at the server system are limited.

In one embodiment, the displayed form at least partially overlays an element, such as a window, displaying the video. The element may be a video element, such as a HTML video element, in particular a HTML5 video element. The displayed form may be fully positioned within the element.

This embodiment further eases the human-machine interaction. The form is preferably presented as close as possible to the displayed video in order to limit the amount of user interactions required for transmitting a message comprising user input to the server system. Such user interactions may comprise a user scrolling a web page.

The form may be positioned within a video element that is embedded on a website. Then, a web page developer only has to program the source code, such that the embedded video window appears at a position on the web page that he desires. The web page developer does not need to program the position of the form in the source code of the web page.

In one embodiment, the form information comprises an indication to pause the video or to continue displaying the video when displaying the form. In this embodiment, the method comprises, based on said indication in the received form information, pausing the video or continuing displaying the video respectively when displaying the form.

This embodiment enables to control the display of the video based on the form information.

In one embodiment, the method comprises receiving the form information with at least two response messages, a first response message comprising the time indication and a second response message comprising further form information. The further form information for example comprises information that is to be presented when displaying the form. This embodiment may comprise, in response to determining that the video reaches the time defined by said time indication, transmitting a request message, optionally comprising the form identifier, comprising a request for the further form information and receiving the further form information. Additionally or alternatively, this embodiment comprises transmitting this request message when downloading the video and/or when displaying the video.

This embodiment may comprise, in response to determining that the video reaches the time defined by said time indication, transmitting to the server system second request message, optionally comprising the form identifier, comprising a request for the further form information and receiving the further form information from the server system.

In this embodiment, the server system may also be configured to automatically, after a predetermined period since the transmission of the video information or form information has passed, transmit the further form information. Hence, this embodiment may also comprise, in response to determining that the video reaches the time defined by said time indication, refraining from transmitting to the server system a message, optionally comprising the form identifier, comprising an instruction to the server system to not transmit the further from information.

This embodiment limits the amount of information that is exchanged between the server system and client computer. After all, the further form information is only transmitted by the server system to the client computer after the client computer determines that the video reaches the time defined by said time indication. If the video is thus stopped before reaching this time, the further form information will not be transmitted, which prevents unnecessary transmission of information and thus limits bandwidth usage.

Additionally or alternatively, the request message may be transmitted in response to detecting a user interaction, for example a user moving his mouse towards a button for closing the web page.

In one embodiment, the form comprises at least one element for collecting user input, such as a text input element and in this embodiment, the method comprises receiving user input upon a user interacting with said at least one element in the displayed form and transmitting at least one message comprising the user input to the server system.

This embodiment enables efficient human-machine interaction.

In one embodiment, the method comprises receiving a confirmation message from the server system, the confirmation message comprising an indication that the server system has processed the user input, and in response performing at least one of the steps of
  ceasing displaying the form and
  resuming displaying the video and
  continuing displaying the video.

This embodiment enables the user who is viewing the video to control the video by interacting with the form. After all, by inputting information he or she can cause video display to resume.

In one embodiment, the user input comprises transaction information required for executing a payment transaction and the indication that the server system has processed the user input comprises an indication that the server system has verified the transaction information. This embodiment enables a transaction involving the user viewing the video.

In one embodiment, determining that the video reaches the time defined by said time indication comprises comparing, optionally repeatedly comparing, an indication of a current time position of the video with the time defined by the time indication in the form information. The time indication for example is the HTML5 timeUpdate event that is repeatedly fired by the HTML5 video-element. This embodiment allows to accurately monitor the progress of the video.

In one embodiment, the method comprises repeatedly, at a first rate, comparing an indication of a current time position of the video with a threshold time associated with the time defined by the time indication in the form information, and, based on one of said comparisons, determining that the video reaches the threshold time and, based on this determination, repeatedly, at a second rate, comparing an indication of the current time position of the video with the time defined in the form information, wherein the second rate is higher than the first rate. This embodiment is advantageous since it allows to accurately determine that the video reaches the time defined in the form information, without requiring significant data processing. After all, the rate at which the current time position of the video is compared is relatively high only for a short time period, when the video is close to the time defined in the form information. The threshold time may be defined as a time that lies a predefined time period, e.g. three seconds, before the time defined in the form information.

In one embodiment, the method comprises receiving at least one message from a server hosting a web page, the at least one message comprising the video identifier and the form identifier. The video identifier and the form identifier may be part of the source code of the web page. This embodiment provides an efficient manner for the client computer to obtain the form identifier and the video identifier, namely when retrieving a web page from a server hosting the web page.

In one embodiment, the method comprises transmitting a request message to a web page server for retrieving a code for rendering the web page and receiving the code for displaying the website, the code comprising the video identifier and the form identifier.

One aspect of this disclosure relates to a computer-implemented method for providing video information. This method comprises storing video information required for playing a video in a data storage in association with a video identifier and storing form information required for displaying a form associated with the video in a data storage in association with a form identifier. The form information comprises a time indication defining a time in the video. This method further optionally comprises receiving from a client computer at least one request message comprising the video identifier and the form identifier and based on the received video identifier and the received form identifier, transmitting the video information and form information respectively to the client computer.

The video information may comprise a playlist file comprising pointers to data storage locations having stored segments of the video One aspect of this disclosure relates to a message comprising video information required for displaying a video and form information required for displaying a form associated with the video, wherein the form information comprises a time indication defining a time in the video.

One aspect of this disclosure relates to a computer comprising a computer readable storage medium having computer readable program code embodied therewith, and a processor, preferably a microprocessor, coupled to the computer readable storage medium, wherein the computer readable program code, when executed by the processor, cause the processor to perform one or more of the method steps as described herein.

One aspect of this disclosure relates to a computer program or suite of computer programs comprising at least one software code portion or a computer program product storing at least one software code portion, the software code portion, when run on a computer system, being configured for executing one or more of the method steps as described herein.

One aspect of this disclosure relates to a non-transitory computer-readable storage medium storing at least one software code portion, the software code portion, when executed or processed by a computer, is configured to perform one or more of the method steps as described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing computer systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIG. 7 illustrates display of the form on a display of a phone or tablet according to one embodiment;

FIG. 8 illustrates display of the form on a display;

DETAILED DESCRIPTION OF THE DRAWINGS

Figure 1:
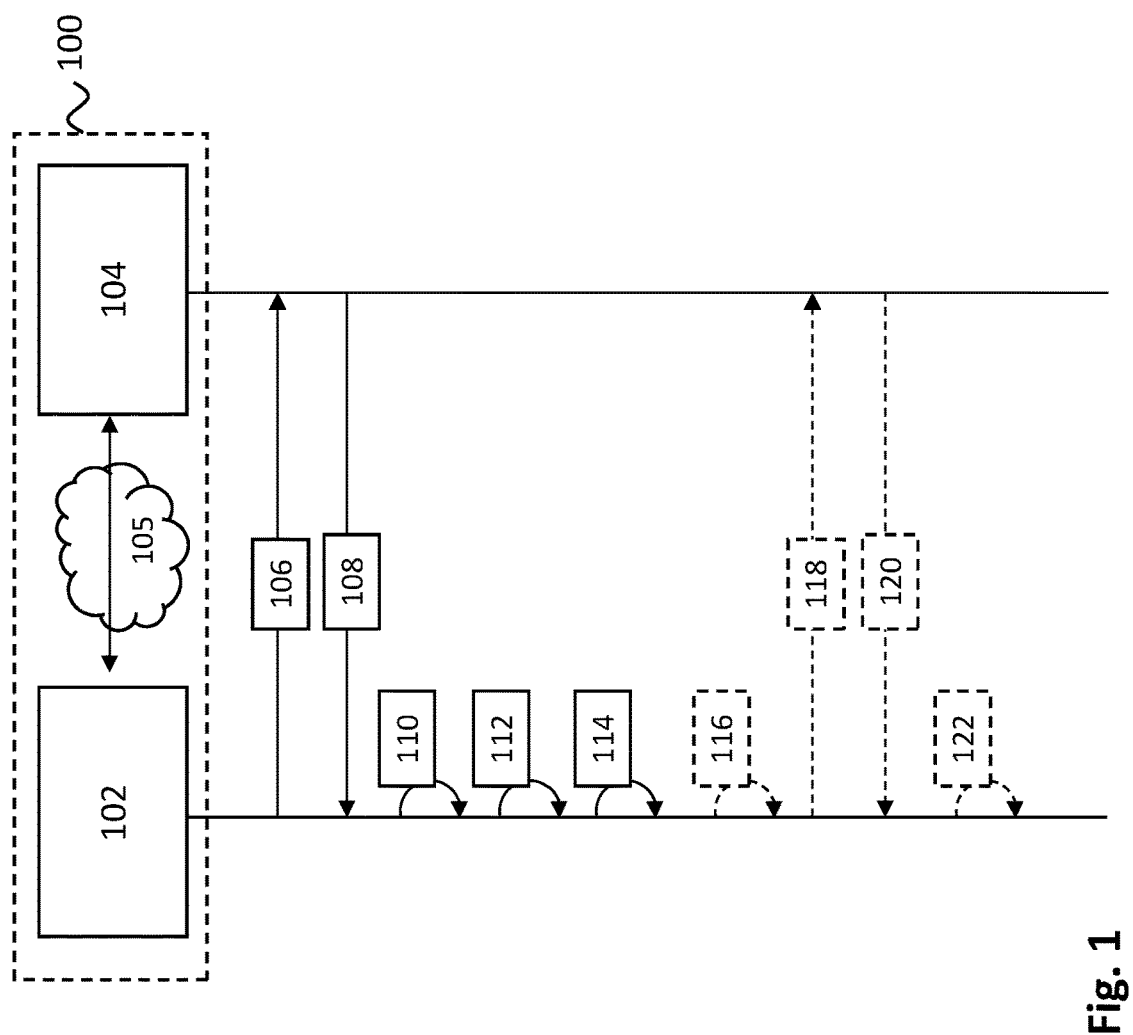
FIG. 1 illustrates a system and method according to respective embodiments.

FIG. 1 illustrates a system 100 according to one aspect of this disclosure. The system 100 comprises a client computer 102 and a server system 104. The client computer 102 and the server system 104 may be configured to connect to each other via a network 105, such as the internet. Messages between the client computer 102 and the server system may be HTTP messages, such as a HTTP Response message and a HTTP Get message. These messages may comprise a JSON payload.

Client computer 102 may be a computer of a user. A web browser application may be installed on the client computer that causes the computer to transmit request messages, for example HTTP Get request messages, for retrieving web pages from servers hosting web pages. The web browser may, upon receipt of a code from a web server, cause the computer to display a web page based on the code received from the web server.

Server system 104 may comprise a plurality of server computers, for example a server computer hosting a web page and/or a server computer that has stored the form information and/or the video information and/or may comprise a plurality of server computer that have stored video segments of the video to be displayed, which may also be referred to as a content distribution (CDN) network.

Optionally, computer 102 comprises a display for displaying the video. In particular, computer 102 may be a desktop computer, a TV and a mobile device, such as a notebook, smart phone and tablet computer.

It should be appreciated that in the context of this disclosure, a step of transmitting a message comprising particular information may comprise transmitting a plurality of messages, wherein the particular information is distributed among this plurality of messages.

FIG. 1 depicts an embodiment of the method for displaying a form associated with a video. Step 106 comprises transmitting at least one request message comprising a video identifier and a form identifier to the server system 104. The video identifier indicates video information required for playing said video and the form identifier indicates form information required for displaying a form, e.g. an HTML form, associated with the video. In step 106, the server system 104 receives this at least one request message.

In step 108, in response to the request message, the server system 104 transmits at least one response message to the client computer 102. In step 108, the client computer 102 receives this at least one response message from the server system. This response message comprises the video information and the form information and the form information comprises a time indication defining a time in the video. In an example, the time indication defines a time in the video in the sense that it defines a time period starting at a first elapsed playtime of the video, for example one minute after the video has started playing, and ending at a second elapsed playtime of the video, for example four minutes and thirty seconds after the video has started playing.

In an embodiment, the form information comprises an indication to pause the video or to continue displaying the video when displaying the form. The method then may comprise, based on said indication in the received form information, pausing the video or continuing displaying the video respectively when displaying the form. An example of the message transmitted in step 108 is:

```
{
"checkout_time": 20.0,
"offer_code": "offer_code",
"pause_on_offer": true
}.
```

The form information herein is "20.0" defining the time in the video at twenty seconds of elapsed time. This message comprises as product identifier "offer code" and as indication to pause the video when displaying the form "true". In this example, the video will thus keep playing behind the form. As a result, the form may obstruct the view on at least part of the video.

In another example, the message comprises as indication to continue displaying the video '"pause on offer": false'. Then, the video may be paused when displaying the form. Optionally, the video controls are hidden when displaying the form. Pausing the video may comprise triggering the HTML5 pause event.

In step 110, the client computer 102 displays the video using the video information. In one embodiment, the video information comprises a playlist file known in the art, based on which the client computer 102 can download various video segments of the video from a Content Distribution Network (CDN). The computer 102 may thus display the video using video streaming technology known in the art.

In step 112 the client computer determines that the video reaches the time defined by said time indication. In response to this determination, the client computer 102 in step 114 displays the form. The form may be understood to provide a user the ability to input information and control his computer to transmit this information to a computer system, e.g. to the server hosting a web page.

Optionally, the displayed form comprises at least one element for collecting user input. An optional step 116 comprises receiving user input upon a user interacting with said at least one element in the displayed form. In an example, the form comprises a text input element, with which the user can interact, e.g. input text such as his name and/or e-mail address and/or a credit card number et cetera. The client computer may receive user input via known means such as a key board, touch screen et cetera. Upon such user interactions, the browser 350 on the user's computer obtains the user input.

Optional step 118 comprises transmitting at least one message comprising the user input to the server system 104. In step 104, the server system 104 receives this message. This message may be a HTTP Post message.

In response to receiving the message in step 118, the server system 104 may process the user input and in response transmit a confirmation message in step 120. In step 120, the client computer 102 receives this confirmation message from the server system. The confirmation message comprises an indication that the server system 104 has processed the user input. In response to the confirmation message, in optional step 122, the client computer 102 performs at least one of the steps of (i) ceasing displaying the form and (ii) resuming displaying the video and (iii) continuing displaying the video.

In a particular embodiment, the user input comprises transaction information required for executing a payment transaction. Herein, the indication that the server system 104 has processed the user input comprises an indication that the server system has verified the transaction information.

In FIGS. 1-9, reference numerals differing by one or more hundreds indicate similar, e.g. identical, elements. Indices 102 and 202 for example both indicate a client computer.

Figure 2:
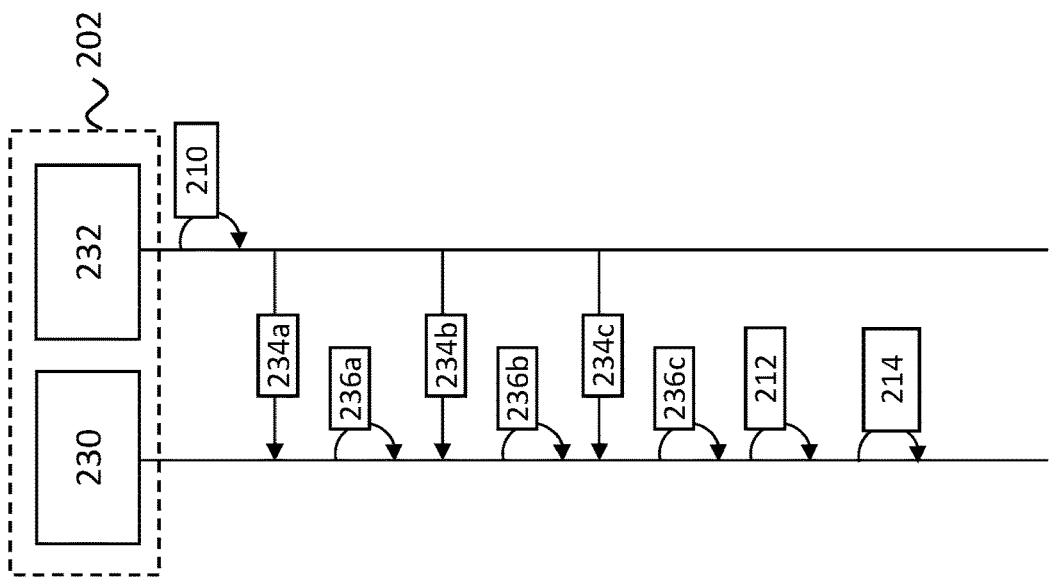
FIG. 2 illustrates interaction between a video element and module 230 according to an embodiment.

FIG. 2 shows that client computer 202 comprises a video element 232, that may be a HTML, e.g. a HTML5, video element. The video element may be employed to embed a video on a web page. To this end, a web page developer may incorporate HTML code fragment associated with the video element into the web page source code. This code fragment for example comprises the video identifier that may be used for retrieving the video information from the server system. Client computer 202 further comprises a module 230, which may be a software module, and which may be embodied as a plugin in an existing web browser, for example a java plugin. The module 230 may perform one or more of the method steps as described herein.

Module 230 may be a software module that can interact with video element 232. For example, the module 230 may be able to control the video element 232 by transmitting commands to the video element, such as a command to pause a video.

Furthermore, module 230 may be able to receive notifications from video element 232, such as notifications relating to a current time position of a video that the video element is displaying.

FIG. 2 in particular illustrates an embodiment of step 112 in FIG. 1, denoted as 212 in FIG. 2. Step 210, similar to step 110 comprises displaying the video using the video information. In particular, the video element 232 may display the video. The video element may appear to a user visiting a web page as a video window that is embedded in the web page.

The video element 232, in step 234a, transmits a message to module 230 comprising an indication of a current time position of the video that is being displayed by the video element 232. In step 234a, the module 230 receives this message.

Subsequently, the module 230, in step 236a, compares the indication of the current time position of the video with the time defined by the time indication in the form information. The module 230 may have received this time indication from the server system (not shown). Based on this comparison, the module 230 may determine whether or not the video reaches the time defined by the time indication.

Steps 234a and 236a are repeated, see steps 234b, 236b, 234c and 236c. The video module 232 may thus repeatedly, as the video is progressing, transmit a message 234a, 234b, 234c to module 230 comprising the current time indication so that the module 230 can compare it in steps 236a, 236b and 236c respectively with the time defined by the time indication in the form information. In an example, the messages 234 correspond to the firing of the timeUpdate event by the video element, as defined by HTML5 standards. The messages 234 may be transmitted every 15 to 250 ms.

In step 236c, again, the module 230 compares an indication of the current time position, which indication it received with message 234c, with the time defined by the time indication. Then, based on this comparison, in step 212, the module 230 determines that the video reaches the time as defined by the time indication previously received.

In one embodiment, the method comprises repeatedly, at a first rate, comparing an indication of a current time position of the video with a threshold time associated with the time defined in the form information. The embodiment further comprises, determining, based on such a comparison, that the video has reached and/or passed the threshold time and, in response to this determination, repeatedly, at a second rate, comparing an indication of a current time position of the video with the time defined in the form information. The threshold time may be defined as a time that lies a particular period, e.g. three seconds, before the time defined in the form information. The second rate may be different from, preferably higher than, the first rate. The first rate may be one comparison every 15 to 250 ms and the second rate may be once every 100 ms. This embodiment allows to accurately display the form at the time defined by the time indication in the form information. In particular, this embodiment allows to accurately monitor the progress of the video when the video is approaching the time at which the form is to be displayed.

In one example, the module 230 first listens to the timeUpdate event, which is fired by a HTML5 video element once every 15 to 250 ms. The exact frequency may depend on the type of web browser used. Then, upon determining that the video has reached the threshold time, the module 230 may listen to the currentTime event, which is fired by a HTML5 video element once every 100 ms.

Thus, the computer 102, in particular, the module 230, monitors the progress of the video as it is displayed by the video element 232. To this end, the module 230 may comprise code from open source library Video.js, which code, when executed causes a computer to be able to process HTML5 video events.

Step 214 comprises, similar to step 114 described with reference to FIG. 1, displaying the form. In one example, the module 230 interacts with a web browser (not shown) for displaying the form.

Figure 3:
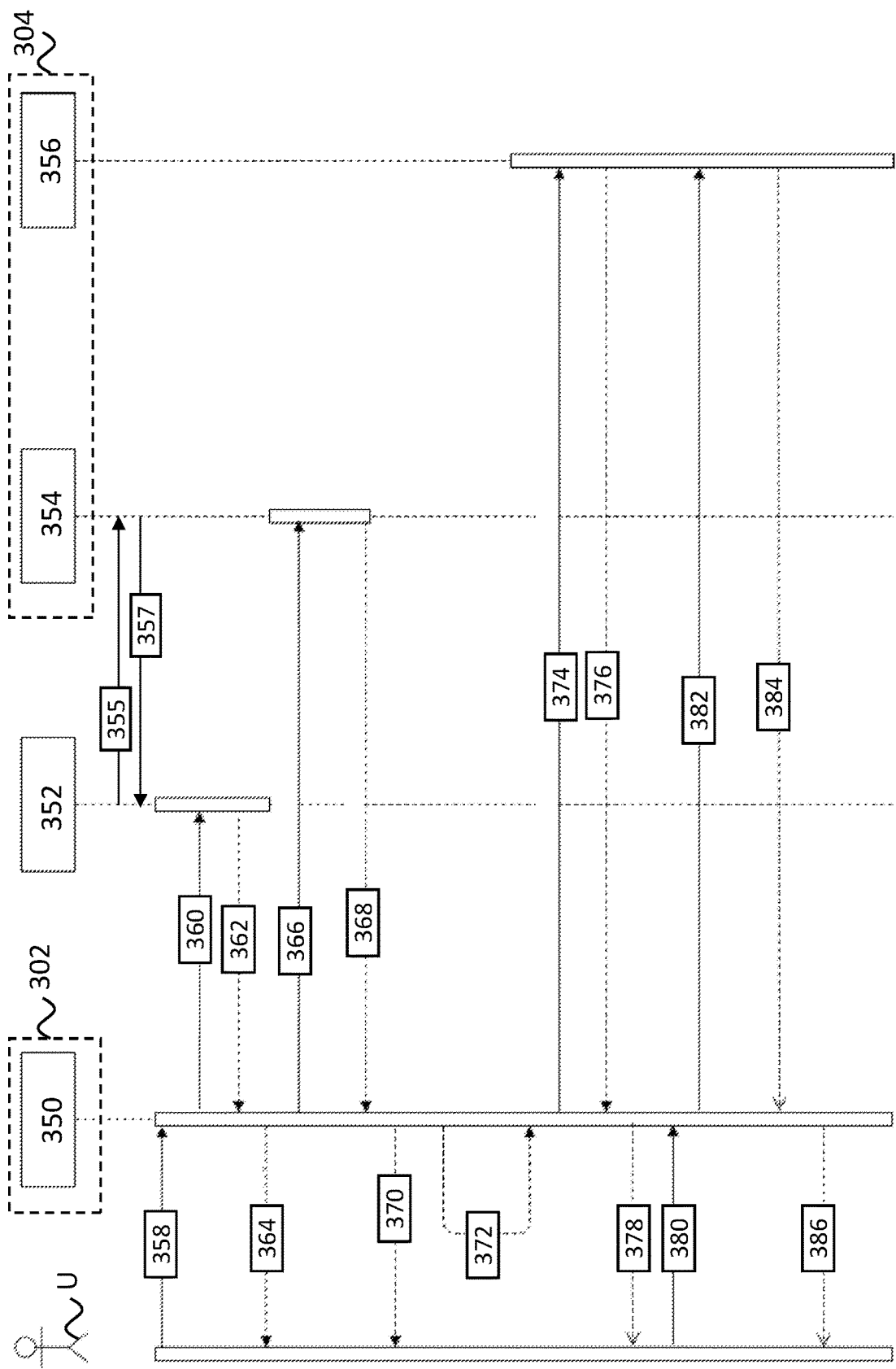
FIG. 3 illustrates a detailed embodiment.

FIG. 3 illustrates a more detailed embodiment of the method. A user U controls the computer 302, and in particular a web browser application 350 installed on the computer 302. The web browser application 350 may comprise a module 230 as described with reference to FIG. 2, for example as a plugin application. Furthermore, the web browser application 350 may comprise the video element 232 as described with reference to FIG. 2. The web browser 350 may comprise the video element 232 in the sense that the web browser processes code fragments associated with the video element 232 and/or in the sense that the web browser displays the video embedded in the web page.

Server system 304 comprises a server computer 354 and a server computer 356. Although not indicated, the server system 304 may also comprise computer 352. Computer 356 may a computer of a payment provider, such as Hotpay, Paypal and Ebanx.

In an embodiment, computer 352 is a computer system of a web page owner. Computer 352 may thus comprise a server (not shown) that is hosting the web page and may comprise a computer of the web page owner, which typically is positioned remote from the server. The owner may offer products for sale on his web page.

Computer 354 may comprise a Content Distribution Network known in the art and computer 356 may comprise a computer for storing and processing user input as will be explained.

In step 355, a party hosting a web page on web server system 352 transmits at least one upload message to computer 354. In step 355, computer 354 receives this upload message. This message comprises video information required for displaying the video and form information required for displaying the form associated with the video, wherein the form information comprises the time indication defining the time in the video. Thus, a web page owner may transmit video content to computer 354 and may also indicate at what time in the video the form is to be presented.

The video information may comprise data representing the video frames that are to be displayed sequentially for displaying the video. As such, the video information is required for displaying the video.

Furthermore, the upload message may also comprise further form information required for displaying the form, such as the text to be displayed on the form and/or information defining the elements in the form for collecting user input.

In a particular example, the form to be presented is a so-called lead capture form. Furthermore, the message transmitted in step 355 may comprise the following payload:

```
{
"checkout_time": 20.0,
"fields": [
{
"name":"name",
"label":"First Name",
"type":"text"
},
{
"name":"email",
"label":"E-mail",
"type":"email"
},
{
"name":"phone",
"label":"Phone Number",
"type":"phone"
}
]
}
```

Herein, the time indication is "checkout time": 20.0', The payload further comprises a list of fields that the form should comprise. In the above example, the form should thus display a text input field for collecting a first name, a text input field for collecting an e-mail address and a text input field for collecting a phone number.

In response to receiving the upload message, computer 354 may distribute the video information among a Content Distribution Network in the sense that it transmits a plurality of video segments to servers forming the CDN. Further, computer 354 may generate a playlist file comprising pointers to the respective video segments for enabling computer 302 to retrieve the respective video segments using the playlist file. As such, the playlist file is required for displaying the video and can thus be regarded as video information. In response to receiving the upload message, the computer 354 may store the video information and the form information at a data storage location and may generate the video identifier and the form identifier. The video identifier and the form identifier may indicate the respective data storage locations of the video information, e.g. of a playlist file as explained above, and of the form information. These identifiers may be understood to be resource identifiers, for example URLs.

Computer 354 thus may store the video information required for playing the video in a data storage in association with a video identifier and may store the form information required for displaying the form associated with the video in a data storage in association with the form identifier. The form information comprises a time indication defining a time in the video.

In step 357, computer 354 transmits a message comprising the video identifier and the form identifier to the computer 352 and in step 357 computer 352 receives this message. Then, the computer 352 may incorporate the video identifier and the form identifier in the source code of the web page.

In step 358, the user computer 302, in particular a web browser 350 running on computer 302, receives a user input instructing the web browser 350 to retrieve a resource, e.g. a web page, from web server system 352. In response, user computer 350 transmits a request message in step 360 for requesting this resource, such as a HTTP Get request message.

In particular, step 360 may comprise transmitting a request message to a web page server 352 for retrieving a code for rendering the web page.

The web server 352 receives request message 360 and in response transmits a message 362 comprising the resource, e.g. the code for rendering the web page. Message 362 may be a HTTP Response message.

In step 362 the computer 302 receives the message from the server 352 hosting the web page. The message comprises the video identifier and the form identifier.

In particular, step 362 may comprise receiving the code for displaying the website, wherein the code comprises the video identifier and the form identifier.

In an example, message 362 comprises HTML code which computer 50, in particular a web browser, can process for displaying a web page on a display of the computer 50. The web browser 350 receives the code and displays in step 364, based on the resource received with message 362, the web page that the user intended to visit.

An example of code that may be transmitted in step 362 is:

```
<div class="hm-player" data-media="jnRvQeYZQr" data-controls="true"
    data-width="1280" data-height="720"> </div>
    <script>(function( ){vare=document,t=e.createElement("script ");
t.src='https://static-
player.hotmart.com/embed/v1/js/embed.min.js',t.setAttribute("data-
timestamp", Number(newDate)),
(e.head||e.body).appendChild(t)})( );</script>
```

In the above example, "jnRvQeYZQr" constitutes both the video identifier and the form identifier. Furthermore, "data-controls="true" is a flag based on which the extent of control that the user has over a video is determined. To illustrate, in one embodiment, by default, a user can only control a video in the sense that he can pause (and subsequently play) the video. Based on the flag, the extent of control can be enlarged in the sense that the user computer determines on the basis of the flag that the user can also seek forward or backward in a video and subsequently enable this. Further, "data-width='1280'" and "data-height='720'" respectively specify the width and height of the video window. These may be expressed as number of pixels. Message 362 may also comprise an indication (not shown) whether the video should start playing automatically right after the web page loads.

Next, the browser 350 may receive a user input (not shown) instructing the web browser 350 to initiate playing the video. In an example, the user U interacts with a video element, e.g. an embedded video element. In another example, in response to processing said resource, for example when loading the web page, the web browser application 350 automatically initiates the playing of the video. This may be the case when the web page contains a video element that automatically starts playing upon presenting the web page to the user.

In step 366, the user computer 302 transmits a request message to server computer 354. In step 366, the server computer 354 receives from the client computer 302 the request message. The request message comprises the video identifier and the form identifier. In an example, in step 366, the user computer 350 will transmit a HTTP request message to server computer 354 on the basis of the following URL:

https://player.hotmart.com/vl/embed/jnRvQeYZQr?enable-controls=true&autoplay=false Note that this URL, and thus also the message transmitted in step 366 comprises "jnRvQeYZQr", which, as explained above, functions both as the video identifier and the form identifier.

Then, the server computer 354, based on the received video identifier and the received form identifier, transmits in step 368 the video information and form information respectively to the client computer 302. In step 368, the client computer 302 receives this information. Herein, the form information may be the time indication defining the time during the video at which the form is to be displayed and the video information may be a playlist file known in the art.

Step 370 then comprises the client computer 302, in particular web browser 350, playing the video.

Step 372 depicts the client computer, in particular a module as described herein, monitoring the video progress and determining that the video reaches the time defined in the form information.

In response, in step 374, the client computer 302 transmits a request message to server computer 356 for requesting further form information. The further form information may comprise additional information that is to be displayed on the form. This request message may be a HTTP request message that may be transmitted by the module 230 described with reference to FIG. 2. FIG. 3 shows that this request message is transmitted after determining that the client computer 302 determines that the video reaches the specified time, however this request message can be transmitted prior to this determination, for example when the video is loaded or during the video's progress.

In response to this request, the server computer 356 may transmit a response message comprising the further form information in step 376. Step 376 thus comprises the client computer 302 receiving a second response message from the server system 304, wherein the first response message may be understood to be the message transmitted in step 368 comprising the time indication. The second response message comprises the further form information required for displaying the form. Clearly, the second response message is received after determining that the video reaches the time defined by said time indication. Thus, the further form information may only be transmitted if the video actually reaches the time defined by the time indication.

Step 378 comprises the client computer 302 displaying the form based on the form information and further form information received in steps 368 and 384 respectively.

Step 380 depicts the client computer 302, in particular the web browser 350, receiving user input. In an example, the user U inputs information by interacting with the displayed form, for example by inserting text in a text field presented on the form.

In step 382, the client computer transmits a message to server computer 356 comprising the user input.

In response, the server computer processes the user input. Processing the user input may comprise storing the user input at a data storage. In step 384, the server computer 356 transmits a confirmation message to the client computer 302 comprising an indication that the user input has been processed. In step 384, the client computer 302 receives this confirmation message.

In step 386, in response to this confirmation message, the client computer 302 may continue playing the video and/or resume playing the video if the video was paused during the display of the form.

The video data identifier may be identical to the form identifier. In an example, the method comprises transmitting, e.g. in step 366 described above a message to the server system comprising one identifier that serves both as video identifier and form identifier. Computer 354 may namely have stored both the video information and the form information in association with this identifier and may thus transmit in step 368 both the form information and the video information to the client computer 302 based on this one identifier.

It should be appreciated that FIG. 3 depicts the situation wherein the payment provider is predetermined. However, it may also be that the user is able to select a payment provider of his choice.

Figure 4:
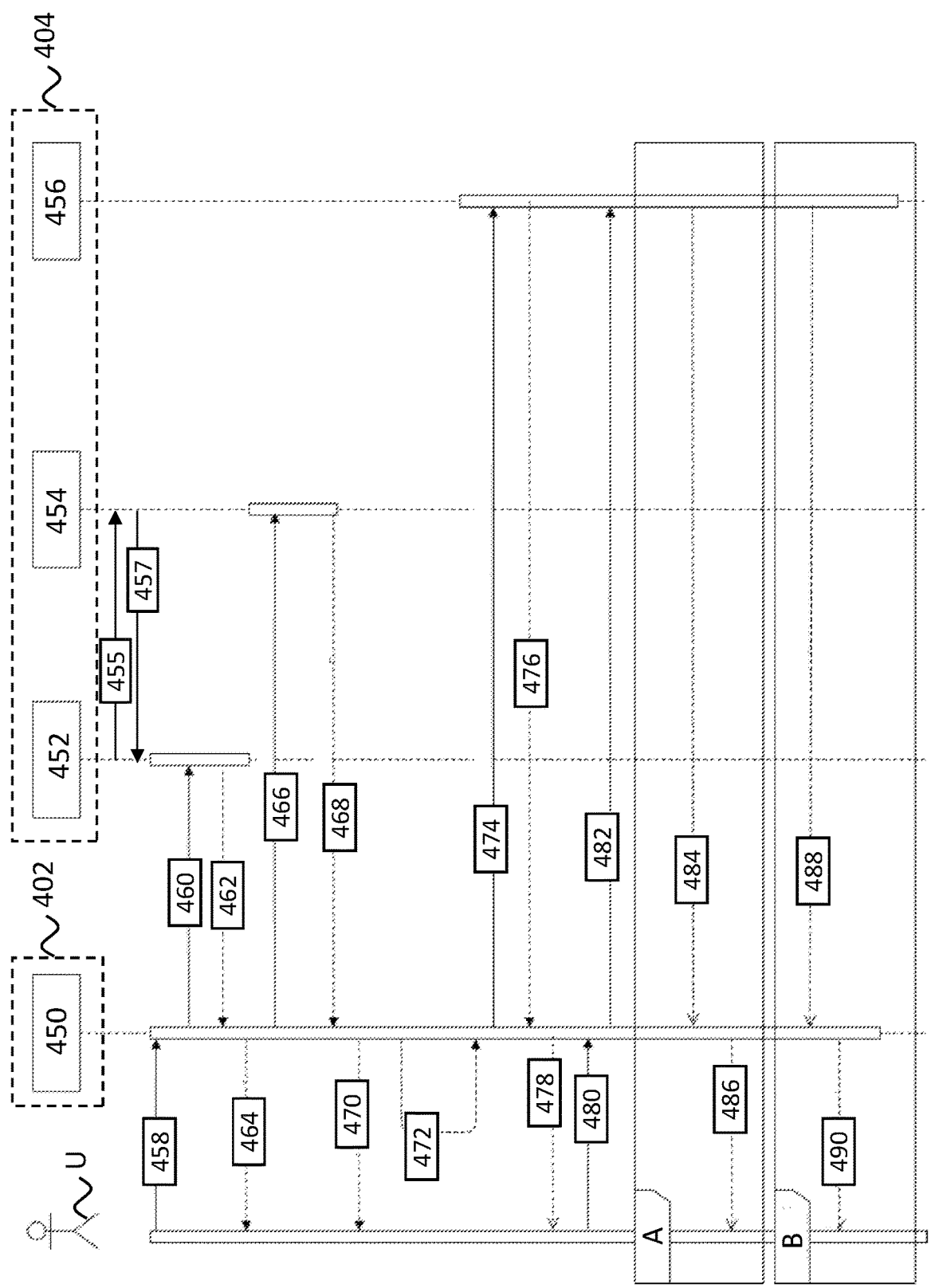
FIG. 4 illustrates a detailed embodiment wherein a check-out form for executing payments is displayed.

FIG. 4 illustrates a method according to one embodiment that enables a user to conveniently making a payment by interacting with the presented form. This allows for example web shop owners to present a product in a video and if the viewer wishes to purchase the product, he can quickly and conveniently execute the required payment. Steps 458-486 respectively correspond to steps 358-386 described with reference to FIG. 3.

In step 468, the server computer 454 thus transmits the video information and the form information to the user computer 402. The form information comprises the time indication defining a time in the video at which the form should display.

In step 476, the user computer 402 receives further form information required for displaying the form. In this example, the further form information defines that the form should present a field in which a user can input payment information, such as a credit card number. Further, preferably, the further from information defines that the form comprises fields in which the user can respectively input his email address and/or payment method.

Optionally, the further form information comprises information that enables the user to select what type of payment he wishes to execute, for example a credit card payment, electronic payment, bank transfer payment et cetera.

As said computer 356 may a computer associated with a payment provider and computer 356 may be configured to send default further form information to the user computer in response to message 374.

It should be appreciated that all communication between user computer 402 and 456 is preferably performed over a secure channel, such as a HTTPS connection.

The form is displayed to the user in step 478 and the web browser receives in step 480 user input as a result of the user interacting with the form and indicating payment information, such as a credit card number, and optionally indicating the method of payment and his e-mail address. The client computer 402 transmits in step 482 the transaction information, such as a credit card number, and in response, the server computer 456 processes the transaction information.

If the transaction information is verified, steps 484 and 486 may be performed (block A). If authentication of the transaction information fails, steps 488 and 490 may be performed (block B).

The authentication of the transaction information performed by computer system 456 may comprise the computer system communicating with a payment service provider, such as PayPal. In an example, the computer system 456 transmits the transaction information to the payment service provider. More particularly, the computer system 456 may transmit the amount of the to be executed transaction to the computer system of the payment service provider and the account number and/or credit card number of the user. In response the payment service provider may check whether the account of the user has sufficient funds for the payment. Furthermore, the payment service provider may perform authentication steps independently from server computer 456, such as directly contacting the user, in order to authenticate the transaction.

The server computer 456 may at some point thus receive a confirmation from the payment service provider that the transaction information has been successfully verified, for example because the payment service provider has successfully performed an authentication procedure and/or has determined that the account holds sufficient funds for the transaction. Step 484 may comprise the server computer 456 transmitting a confirmation message to client computer 402 comprising an indication that the transaction information can be verified.

Step 486 may comprise notifying the user that the transaction information the user has input is accepted. Step 486 may further comprise presenting a hyperlink to the user, which redirects to a web page relating to the product.

It should be appreciated that the purchased product may also relate to video content. In a particular example, the video was paused when the form was displayed and only resumes after the user has filled in transaction information that subsequently was successfully verified. In this particular example, the purchased product thus relates to the video content that is to be displayed after the form, i.e. to video content to be displayed after the time defined by the time indication in the form information.

Step 499 may comprise the server computer 456 transmitting a message to client computer 402 comprising an indication that the transaction information was not verified.

Step 490 may comprise notifying the user that the transaction information that the user has input was not accepted.

The payment process described above is preferably compliant with the known Payment Card Industry (PCI) standards.

It should be appreciated that FIG. 4 depicts the situation wherein the payment service provider is predefined. However, in one embodiment, on the basis of the information that is received in step 468, upon determining that the video reaches the time defined in the form information in step 472, the user computer 402 displays a first form with which the user can interact in order to select a payment provider. Then, based on this interaction, the user computer 402 may be configured to transmit a message such as message 474 to a computer of the selected service payment provider. Then, the process as depicted in FIG. 4 may be followed. Herein, it should be appreciated that in step 478, a second form is presented to the user with which the user can interact, for example to indicate his preferred method of payment with the selected payment service provider.

Figure 5:
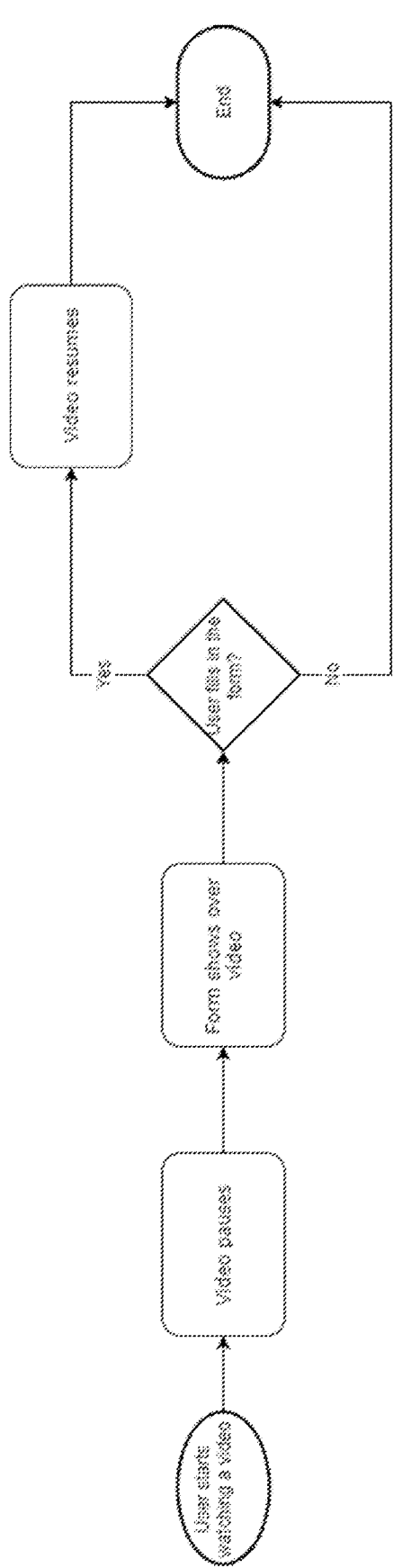
FIG. 5 illustrates a user experience in accordance with an embodiment.

FIG. 5 illustrates a flow that a user may experience while interacting with his computer. The flow begins with the computer playing the video. Then, at some point during the video, the video may pause and a form may be displayed over the video. Then, the user may choose whether he wishes to input information in the form. If the user indeed fills in the information, the video resumes. However, if the user does not fill in the form, the video will not resume.

In this flow, the video pausing when displaying the form may be based on the indication to pause the video that may be present in the form information of in the further form information. Further, the video resuming after the user has filled in the form may be the result of the client computer transmitting a message comprising the user input to a server system, receiving a confirmation message from the server system comprising an indication that the user input was processed, e.g. that the user input was stored or well-received, and the client computer, based on this indication, resuming playing the video.

This embodiment shows that the methods disclosed herein may allow the viewer of the video to control the video by interacting with the form.

Figure 6:
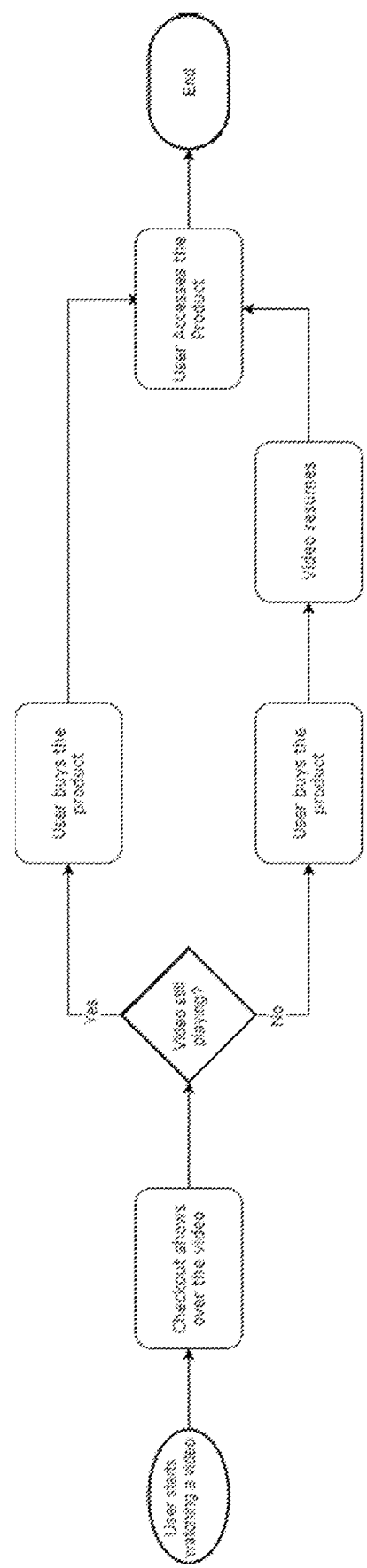
FIG. 6 illustrates a user experience in accordance with an embodiment wherein a check-out form for executing a payment is displayed.

FIG. 6 illustrates a flow that a user may experience while interacting with his computer. Again the flow begins with the computer playing the video. In this example, the video content relates to a product that is for sale on a web shop. Then at some point in time, the form may display over the video. In this example, the form is a check-out form in the sense that it comprises elements for collecting transaction information as described herein. The flow shows two options depending on whether the video keeps playing while the form is displayed.

This depends on the indication whether or not to pause the video while displaying the form that may be present in the form information or in the further form information.

After the user has entered transaction information, for example his credit card number, and after this transaction information is verified by the server system, either the web browser may be redirect immediately to a web page relating to the product that the user has bought, or, if the video kept playing during the display of the form, the video may be resumed and the form may no longer be displayed and the web browser may be directed to the web page relating to the product after the video has finished.

FIG. 7 illustrates an embodiment, wherein the client computer 702 is a smart phone or tablet computer. The video 792 is presented on a part of a display of the computer 702.

FIG. 8 illustrates that the displayed form 894 at least partially overlays an element 892, such as a window 892, displaying the video. The displayed form 894 comprises an element 896 for collecting user input. In the example shown on top, the user in invited to enter his e-mail address. This embodiment advantageously allows a web page owner to obtain lead information.

In one embodiment, as also illustrated by the top example the method comprises hiding video controls when displaying the form. When the video is paused while showing the form and the video controls are hidden, the user may only be able to resume the video by inputting information in the form, which information may be verified by the server system.

In the example shown on the bottom, a user is invited to both enter his e-mail address in element 896a and transaction information in the form of his credit card number in element 896b. The displayed form 894 further shows additional information 898, such as a product name, a product description and a price of the product. Such information may be present in the further form information as described herein.

Cascading Style Sheets (CSS) may be used to position the form on a HTML page. These style sheets may be included in message 368.

An example of a CSS that may be used to position the form on an HTML page is the following:

```
. overlay -- frame {
  border - radius : 10px;
  border - bottom - left - radius : 0;
  border - bottom - right - radius : 0;
  bottom : 0;
  top : 10px;
  left : 10px;
  right : 10px;
  background : 0 0;
  z - index : 1000;
  position : fixed;
  padding : 0 ! important;
  background : rgba ( 245 , 245 , 245 ,. 94 );
  font - size : 16px;
  color : #444;
}
```

In one embodiment, the relative position or relative size of the form on a display depends on the amount of pixels that the display contains. Herein, relative position may be understood to be the position of the form with respect to the display, e.g. in the center of the display or in the top right corner of the display. The relative size of the form may be understood to be the size of the form with respect to the size of the display, e.g. full size fully covering the display or half size, covering half of the display as shown in FIG. 7. To illustrate, if the video and form are to be presented on a mobile phone, which may be defined as a device having a display having a width less than 793 pixels, the form may be presented full screen to the user, herewith completely covering the video. However, in case the form is to be presented on a display of a desktop computer, the form may be presented such that it only partially covers the video, as shown in FIG. 8.

Figure 9:
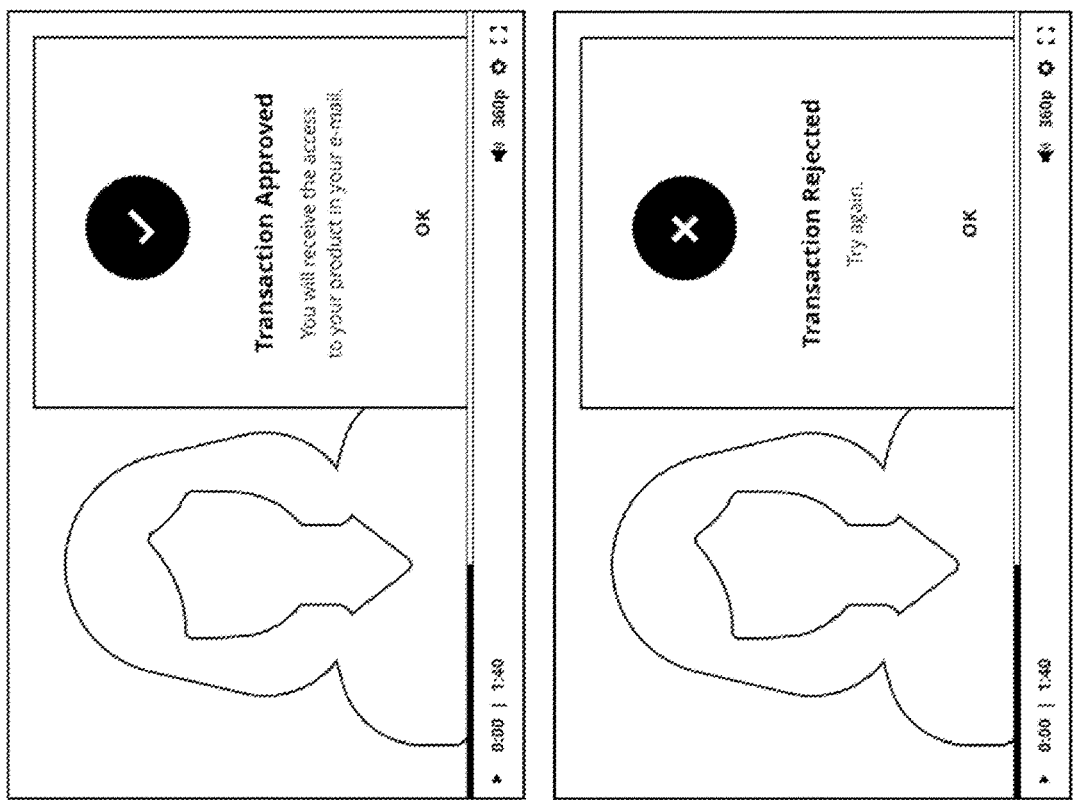
FIG. 9 shows notifications that may be presented to a user according to an embodiment.

FIG. 9 shows notifications that may be presented to a user respectively notifying the user that the transaction information that the user has input was successfully verified or that the transaction information was not successfully verified, respectively.

Figure 10:
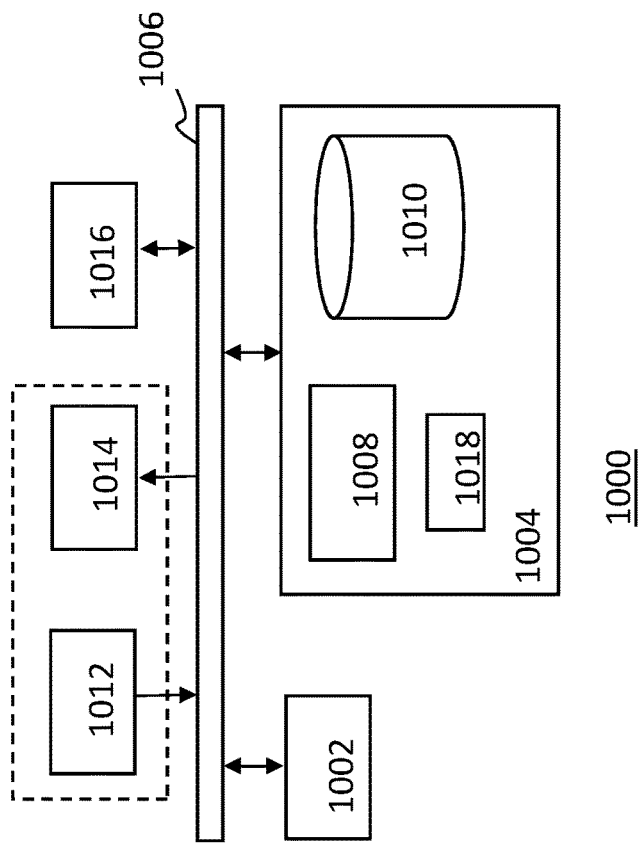
FIG. 10 illustrates an exemplary data processing system according to an embodiment.

FIG. 10 depicts a block diagram illustrating an exemplary data processing system that may be used in a computing system as described herein.

As shown in FIG. 10, the data processing system 1000 may include at least one processor 1002 coupled to memory elements 1004 through a system bus 1006. As such, the data processing system may store program code within memory elements 1004. Further, the processor 1002 may execute the program code accessed from the memory elements 1004 via a system bus 1006. In one aspect, the data processing system may be implemented as a computer that is suitable for storing and/or executing program code. It should be appreciated, however, that the data processing system 1000 may be implemented in the form of any system including a processor and a memory that is capable of performing the functions described within this specification.

The memory elements 1004 may include one or more physical memory devices such as, for example, local memory 1008 and one or more bulk storage devices 1010. The local memory may refer to random access memory or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from the bulk storage device 1010 during execution.

Input/output (I/O) devices depicted as an input device 1012 and an output device 1014 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 1012 and the output device 1014). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1016 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1000, and a data transmitter for transmitting data from the data processing system 1000 to said systems, devices and/or networks. Modems, cable modems, and Ethernet cards are examples of different types of network adapter that may be used with the data processing system 1000.

As pictured in FIG. 10, the memory elements 1004 may store an application 1018. In various embodiments, the application 1018 may be stored in the local memory 1008, the one or more bulk storage devices 1010, or apart from the local memory and the bulk storage devices. It should be appreciated that the data processing system 1000 may further execute an operating system (not shown in FIG. 10) that can facilitate execution of the application 1018. The application 1018, being implemented in the form of executable program code, can be executed by the data processing system 1000, e.g., by the processor 1002. Responsive to executing the application, the data processing system 1000 may be configured to perform one or more operations or method steps described herein.

In one aspect of the present invention, the data processing system 1000 may represent a client computer, server computer, or any computer as described herein.

In another aspect, the data processing system 1000 may represent a client data processing system. In that case, the application 1018 may represent a client application that, when executed, configures the data processing system 1000 to perform the various functions described herein with reference to a "client". Examples of a client can include, but are not limited to, a personal computer, a portable computer, a mobile phone, or the like.

In yet another aspect, the data processing system 1000 may represent a server. For example, the data processing system may represent an (HTTP) server, in which case the application 1018, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1002 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A computer-implemented method for displaying a form associated with a video, the method comprising:
   transmitting at least one request message comprising a video identifier and a form identifier to a server system, wherein the video identifier indicates video information required for playing said video and the form identifier indicates form information required for displaying a form associated with the video, wherein the form information comprises a time indication defining a time in the video,
   receiving at least one response message from the server system comprising the video information and the form information, displaying the video using the video information,
determining that the video reaches the time defined by said time indication, and in response
displaying the form, wherein the form information comprises an indication specifically for the form indicated by the form information to pause the video or to continue displaying the video when displaying the form, the indication being independent of any user selection during the displaying of the video, the indication being a true/false toggle, and
either (i) pausing the video when displaying the form if the true/false toggle in the received form information has a true value or (ii) continuing displaying the video when displaying the form if the true/false toggle in the received form information has a false value.

2. The method according to claim 1, wherein the displayed form at least partially overlays an element displaying the video.

3. The method according to claim 1, comprising
receiving at least a first response message and a second response message from the server system, the first response message comprising the time indication and the second response message comprising further form information required for displaying the form, the further form information comprising information that is to be presented when displaying the form, wherein the second response message is received after determining that the video reaches the time defined by said time indication.

4. The method according to claim 1, wherein the form comprises at least one element for collecting user input, the method comprising
receiving user input upon a user interacting with said at least one element in the displayed form, and
transmitting at least one message comprising the user input to the server system.

5. The method according to claim 4, further comprising:
receiving a confirmation message from the server system, the confirmation message comprising an indication that the server system has processed the user input, and in response performing at least one of the steps of:
ceasing displaying the form,
resuming displaying the video, and
continuing displaying the video.

6. The method according to claim 1, wherein:
the user input comprises transaction information required for executing a payment transaction, and
the indication that the server system has processed the user input comprises an indication that the server system has verified the transaction information.

7. The method according to claim 6, wherein the transaction information comprises a credit card number and/or account number of the user.

8. The method according to claim 6, wherein the server system verifying the transaction information comprises the server system transmitting the transaction information to a computer system of a payment service provider and the server system receiving confirmation from the computer system of the payment service provider that the transaction information has been successfully verified.

9. The method according to claim 8, wherein the computer system of the payment service provider verifying the transaction information comprises the computer system of the payment service provider verifying that an account of the user has sufficient funds for a payment.

10. The method according to claim 1, wherein the user input indicates a method of payment.

11. The method according to claim 1, wherein determining that the video reaches the time defined by said time indication comprises comparing an indication of a current time position of the video with the time defined by the time indication in the form information.

12. The method according claim 11, further comprising:
repeatedly, at a first rate, comparing an indication of a current time position of the video with a threshold time associated with the time defined by the time indication in the form information,
based on at least one of said comparisons, determining that the video reaches the threshold time and,
based on this determination, repeatedly, at a second rate, comparing an indication of the current time position of the video with the time defined in the form information, wherein the second rate is higher than the first rate.

13. The method according to claim 1, further comprising:
transmitting a request message to a web page server for retrieving a code for rendering the web page, and
receiving the code for displaying the website, the code comprising the video identifier and the form identifier.

14. A computer comprising:
a computer readable storage medium having computer readable program code embodied therewith, and
a processor coupled to the computer readable storage medium, wherein the computer readable program code, when executed by the processor, cause the processor to perform the method according to claim 1.

15. A non-transitory computer-readable storage medium storing at least one software code portion, the software code portion, when executed or processed by a computer, is configured to perform the method according to claim 1.

16. The method according to claim 1, wherein:
the form comprises at least one element for collecting user input, and
the displayed form at least partially overlays an element displaying the video, the method further comprising:
receiving user input comprising transaction information required for executing a payment transaction upon a user interacting with said at least one element in the displayed form,
transmitting at least one message comprising the transaction information to the server system, and
receiving a confirmation message from the server system, the confirmation message comprising an indication that the server system has verified the transaction information, and in response resuming or continuing displaying the video.

17. The method according to claim 1, wherein:
the received form information comprises an indication to pause the video when displaying the form, and
the method comprises, based on said indication in the received form information, pausing the video when displaying the form.

18. The method according to claim 1, wherein:
the form information further comprises an indication to pause the video or to continue displaying the video when displaying the form,
receiving the at least one response message comprises receiving at least a first response message and a second response message from the server system, the first response message comprising the time indication and the second response message comprising further form information required for displaying the form, the further form information comprising information that is to be presented when displaying the form, wherein the second response message is received after determining that the video reaches the time defined by said time indication, and the method further comprises, based on said indication in the received form information, pausing the video or continuing displaying the video when displaying the form, wherein said indication is independent of any user selection during the displaying of the video.

19. A computer-implemented method for providing video information, the method comprising:

storing video information required for playing a video in a data storage in association with a video identifier and storing form information required for displaying a form associated with the video in a data storage in association with a form identifier, wherein the form information comprises a time indication defining a time in the video, wherein the form information comprises an indication specifically for the form indicated by the form information to pause the video or to continue displaying the video when displaying the form, the indication being independent of any user selection during the displaying of the video, the indication being a true/false toggle, receiving from a client computer at least one request message comprising the video identifier and the form identifier, and based on the received video identifier and the received form identifier, transmitting the video information and form information respectively to the client computer.

20. A computer comprising:
a computer readable storage medium having computer readable program code embodied therewith, and
a processor coupled to the computer readable storage medium, wherein the computer readable program code, when executed by the processor, cause the processor to perform the method according to claim 19.

21. A non-transitory computer-readable storage medium storing at least one software code portion, the software code portion, when executed or processed by a computer, is configured to perform the method according to claim 19.

22. The computer-implemented method according to claim 19, wherein the form information is transmitted in a first response message to the client computer, the method further comprising after determining that the video reaches the time defined by said time indication, transmitting a second response message to the client computer, the second response message comprising further form information required for displaying the form, the further form information comprising information that is to be presented when displaying the form.

23. The computer-implemented method according to claim 19, wherein the form information comprises an indication to pause the video or to continue displaying the video when displaying the form, wherein said indication is independent of any user selection during the displaying of the video, and wherein the form information is transmitted in a first response message to the client computer, the method further comprising after determining that the video reaches the time defined by said time indication, transmitting a second response message to the client computer, the second response message comprising further form information required for displaying the form, the further form information comprising information that is to be presented when displaying the form.

24. A computer-implemented method for displaying a form associated with a video, the method comprising:

transmitting at least one request message comprising a video identifier and a form identifier to a server system, wherein the video identifier indicates video information required for playing said video and the form identifier indicates form information required for displaying a form associated with the video, wherein the form information comprises a time indication defining a time in the video, receiving at least one response message from the server system comprising the video information and the form information, displaying the video using the video information, determining that the video reaches the time defined by said time indication, and in response displaying the form, wherein determining that the video reaches the time defined by said time indication comprises repeatedly, at a first rate, comparing an indication of a current time position of the video with a threshold time associated with the time defined by the time indication in the form information, and, based on at least one of said comparisons, determining that the video reaches the threshold time and, based on this determination, repeatedly, at a second rate, comparing an indication of the current time position of the video with the time defined in the form information, wherein the second rate is higher than the first rate.

25. A computer comprising:
a computer readable storage medium having computer readable program code embodied therewith, and
a processor coupled to the computer readable storage medium, wherein the computer readable program code, when executed by the processor, cause the processor to perform the method according to claim 24.

26. A non-transitory computer-readable storage medium storing at least one software code portion, the software code portion, when executed or processed by a computer, is configured to perform the method according to claim 24.

* * * * *

UNITED STATES PATENT AND TRADEMARK OFFICE
CERTIFICATE OF CORRECTION

| | | |
|---|---|---|
| PATENT NO. | : 11,490,147 B2 | Page 1 of 1 |
| APPLICATION NO. | : 16/403076 | |
| DATED | : November 1, 2022 | |
| INVENTOR(S) | : Almeida et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 21 days.

Signed and Sealed this
Twelfth Day of August, 2025

Coke Morgan Stewart
*Acting Director of the United States Patent and Trademark Office*